United States Patent Office 3,737,415
Patented June 5, 1973

---

3,737,415
POLYMERCAPTAN POLYMERIC SEALANT FORMULATION
Joseph R. Kenton, Bartlesville, Okla., assignor to Phillips Petroleum Company, Bartlesville, Okla.
No Drawing. Filed Sept. 17, 1971, Ser. No. 181,597
Int. Cl. C08g 23/00
U.S. Cl. 260—79                7 Claims

ABSTRACT OF THE DISCLOSURE

A cured sealant composition comprising polymercaptan terminated polymers having at least on the average 2.5 pendent thiol groups per molecule and at least one alkyl monomercaptan.

---

This invention relates to disulfide sealant formulations.

In one of its more specific aspects, this invention relates to the use of alkyl monomercaptans in liquid sealant formulations having as their base polymercaptan terminated polymers. Such addition produces a cured sealant having highly elastomeric qualities.

According to this invention there is provided a composition comprising at least one poly(oxyalkylene)-polyester-polythiol having at least on the average 2.5 pendent thiol groups per molecule and at least one alkyl monomercaptan, said composition being convertible to a cured state. Such compositions are employable as adhesives, sealants and the like.

Suitable alkyl monomercaptans for use in the present invention comprise 1-alkanethiols having 6 to 18 carbon atoms and mixtures thereof.

In general, the compositions concerned herein will be comprised of the 1-alkanethiols in an amount within the range of from about 0.15 percent to about 2.0 percent of the weight of the poly(oxyalkylene)-polyester-polythiol, depending on the number of carbon atoms in the 1-alkanethiol employed, these two components comprising from 25 up to about 100 weight percent of the sealant composition, fillers and the like being includable.

The polymercaptan terminated polymers to which the alkyl monomercaptans are added can be prepared in a number of ways. A mercaptoalkanoic acid can be reacted with a poly(oxyalkylene)-polyol having at least on the average 2.5 pendent hydroxy groups per molecule to form the polymercaptan terminated polymer.

Alternately, a mixture of mercaptoalkanoic and thiodialkanoic acids can be esterified with poly(oxyalkylene)-polyols to produce the polymercaptan terminated polymers. The mercaptoalkanoic acids which can be employed are represented by the formula

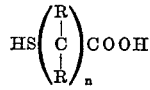

wherein R is H or alkyl having in the range of 1–5 carbon atoms, there being a maximum total of 10 carbon atoms in all R groups per molecule, and wherein $n$ is an integer having a value within the range of 1 to 5. Suitable mercaptoalkanoic acids include 2-mercaptoethanoic acid, 3,3-dimethyl-6-mercaptohexanoic acid and the like.

Suitable thiodialkanoic acids which can be admixed with the mercaptoalkanoic acids have the general formula

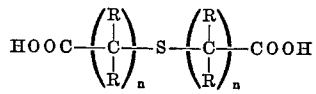

wherein R and $n$ are as previously defined, there being, in this instance, no more than 20 carbon atoms in all R group per molecule.

Suitable thiodialkanoic acids include thiodipropionic acid [3-(2-carboxyethylthio)propanoic acid], 6-[1-(4-carboxybutyl)hexylthio]undecanoic acid, and the like.

In forming the poly(oxyalkylene)-polyester-polythiol, the mercaptoalkanoic acid or mixture of mercaptoalkanoic acid and thiodialkanoic acids are esterified with poly(oxyalkylene)-polyols to give, respectively, poly(oxyalkylene)-polyester-polythiols and poly(oxyalkylene)-polyester-poly(monosulfide)-polythiols. Suitable poly(oxyalkylene)-polyols are prepared by contacting a polyol with an epoxy-substituted hydrocarbon. Suitable polyols include glycerine, pentaerythritol, 1,3,8-trihydroxycyclododecane and the like. Suitable epoxy-substituted hydrocarbons include 1,2-epoxypropane, 1,2-epoxyethane, and the like.

The following examples illustrate this invention. Example I illustrates the preparation of the polymercaptan terminated polymers which form the base for the sealant formulations. Example II illustrates the results of the addition of the alkyl monomercaptans thereto to form the composition of this invention. These examples are not to limit the invention to either the materials involved or to the proportions employed.

EXAMPLE I 1923.9 grams of a commercially-available poly(oxyalkylene)-polyol, derived from 1,2,6-hexanetriol and propylene oxide and having a molecular weight of about 4500 and a hydroxyl number of about 34 were mixed with 1600 ml. of xylene. 20 grams of p-toluenesulfonic acid were added as an esterification catalyst. 160 grams of 3-mercaptopropionic acid were then added and the mixture was reacted at reflux temperature for about eight hours after which it was neutralized with ammonia and filtered.

The filtrate was concentrated to yield 1987.8 g. of a poly(oxyalkylene)polyester-polythiol which had a mercaptan value of 1.7 weight percent thiol groups and an acid number of 0.4 mg. of KOH per gram of sample.

The esterification reaction employed can be carried out at a temperature within the range of from 50° to 250° C. in diluents such as toluene, benzene, xylene, etc., in the presence of acid esterification catalysts at pressures in the range of from 0.5 to 10 atmospheres. The reaction is effected to an extent such that at least about 80 percent of the pendent hydroxy groups of the poly(oxyalkylene)-polyol are reacted with the carboxylic acid groups of the mercaptoalkanoic acid or mixtures of mercaptoalkanoic and thiodialkanoic acids to form ester groups. In general, about three ester groups are formed for each molecule of poly(oxyalkylene)-polyol and approximately 0.8 to 1.2 equivalents of pendent hydroxy groups of the poly(oxyalkylene)-polyols are used for each equivalent of the carboxylic acid group. Nearly stoichiometric amounts up to as much as 10 equivalent percent excess of hydroxy groups are preferred in the reaction.

EXAMPLE II

A polymercaptan terminated polymer, that is, the poly(oxyalkylene)-polyester-polythiol prepared in Example I, was combined with the ingredients shown to produce a sealant formulation. The present invention is represented by Composition II, by the inclusion therein of alkyl monomercaptans in the form of a mixture of $C_{11}$ to $C_{14}$ 1-alkanethiols. Composition I is a comparable composition lacking the alkyl monomercaptans.

| Ingredient: | Composition, parts by weight | |
|---|---|---|
| | I | II |
| Base from Example I | 100 | 100 |
| TiO$_2$ | 20 | 20 |
| CaCO$_3$ | 40 | 40 |
| Silica, fumed | 5 | 5 |
| Polychlorinated diphenyl | 15 | 15 |
| Sulfur | 0.05 | 0.05 |
| γ-Glycidoxypropyltrimethoxysilane | 3.0 | 3.0 |
| Curing agent comprising 50 wt. percent PbO$_2$ and 50 wt. percent dibutyl phthalate | 7.5 | 8.0 |
| Tris-2,4,6-(dimethylaminoethyl)phenol | 1 | 1 |
| C$_{11}$ to C$_{14}$ 1-alkanethiols | | 0.7 |
| Tests upon curing: | | |
| 50% modulus | 48 | 33.6 |
| Tensile break, p.s.i. | 329 | 261 |
| Percent elongation | 300 | 316 |
| Shore A hardness, 30 sec | 30/25.5 | 18/14.5 |
| Adhesion properties after 100% extension: | | |
| Glass-aluminum | (1) | (2) |

[1] Adhesive and cohesive failure in 5 mins.
[2] Cohesive failure after 14 hours.

The composition of this invention can be cured by any of the conventional methods employing air, organic peroxides and hydroperoxides as are usually employed in the curing of such sealant formulations.

The above data indicate that the product of this invention is softer and possesses an improved cohesive strength for glass adhered to aluminum.

It will be evident that various modifications can be made to the method of this invention. However, such are considered to be within the scope of the invention.

What is claimed is:

1. A composition of matter prepared by curing a mixture comprising a polymercaptan terminated polymer selected from poly(oxyalkylene)-polyester-polythiols and poly(oxyalkylene)-polyester-poly(monosulfide)-polythiols having at least on the average 2.5 pendent thiol groups per molecule, at least one alkyl monomercaptan having from 6 to 18 carbon atoms, and a curing agent, the amount of said alkyl monomercaptan being in the range of about 0.15 to about 2 weight percent of said polymercaptan terminated polymer.

2. The composition of claim 1 in which said polymercaptan terminated polymer is a poly(oxyalkylene)-polyester-polythiol.

3. The composition of claim 1 in which said alkyl monomercaptan comprises a mixture of 1-alkanethiols containing from 11 to 14 carbon atoms.

4. The composition of claim 1 in which the mixture of said alkyl monomercaptan and said polymercaptan terminated polymer is present in said composition in an amount within the range of from 25 to about 100 weight percent of the total composition.

5. The composition of claim 2 in which said polymercaptan is derived from the reaction 3-mercaptopropionic acid with a poly(oxyalkylene)-polyol formed from 1,2,6-hexanetriol and propylene oxide.

6. The composition of claim 5 in which the alkyl monomercaptan comprises a mixture of C$_{11}$ to C$_{14}$ 1-alkanethiols.

7. The composition of claim 6 which additionally contains at least one particulate filler and a curing agent comprising lead dioxide.

References Cited

UNITED STATES PATENTS

| 3,219,638 | 11/1965 | Warner | 260—79 |
| 3,312,669 | 4/1967 | Giordano | 260—79.1 |
| 3,386,950 | 6/1968 | Horvath et al. | 260—45.7 |

DONALD E. CZAJA, Primary Examiner

M. I. MARQUIS, Assistant Examiner

U.S. Cl. X.R.

161—187; 260—30.8 R, 37 R, 40 R, 79.1